(12) United States Patent
Kondziela

(10) Patent No.: US 8,094,791 B2
(45) Date of Patent: Jan. 10, 2012

(54) BIOMETRIC SYSTEMS AND METHODS FOR ENHANCED CALLER IDENTIFICATION AND CALL INTERCEPT

(75) Inventor: James M. Kondziela, Stamford, CT (US)

(73) Assignee: Verizon Data Services LLC, Temple Terrace, FL (US)

( * ) Notice: Subject to any disclaimer, the term of this patent is extended or adjusted under 35 U.S.C. 154(b) by 1419 days.

(21) Appl. No.: 11/614,689

(22) Filed: Dec. 21, 2006

(65) Prior Publication Data

US 2008/0152100 A1     Jun. 26, 2008

(51) Int. Cl.
- *H04M 3/42* (2006.01)
- *H04M 7/00* (2006.01)
- *H04M 11/00* (2006.01)
- *G06K 9/00* (2006.01)
- *G06F 21/00* (2006.01)

(52) U.S. Cl. ........... 379/93.03; 379/196; 379/201.02; 379/207.13; 379/221.09; 382/115; 713/186

(58) Field of Classification Search ............ 379/188, 379/196, 197, 198, 201.01, 201.02, 207.13, 379/207.14, 207.15, 221.08, 221.09, 221.1, 379/221.11, 221.12, 93.02, 93.03; 382/115, 382/116, 119, 120, 121, 122; 713/186
See application file for complete search history.

(56) References Cited

U.S. PATENT DOCUMENTS

| | | | |
|---|---|---|---|
| 5,872,834 A * | 2/1999 | Teitelbaum | 379/93.03 |
| 5,999,609 A * | 12/1999 | Nishimura | 379/201.01 |
| 7,706,574 B1 * | 4/2010 | Ross | 382/115 |
| 7,797,549 B2 * | 9/2010 | Main et al. | 713/186 |
| 7,864,987 B2 * | 1/2011 | Venkatanna et al. | 382/115 |

* cited by examiner

*Primary Examiner* — Harry Hong

(57) ABSTRACT

A system includes at least one service switching device in communication with a first calling device and a second calling device. The system further includes at least one service control point in communication with the at least one service switching device and is configured to route incoming and outgoing calls between the first and the second calling devices, wherein the service control point is configured to collect and save biometric keystrokes from a calling party to identify the calling party to a called party.

22 Claims, 2 Drawing Sheets

BIOMETRIC SYSTEMS AND METHODS FOR ENHANCED CALLER IDENTIFICATION AND CALL INTERCEPT

BACKGROUND

In recent years, caller identification ("caller ID") has become a common-place telephone service offering that provides a receiving party with the identity of the calling party. In one known implementation of caller ID, the calling party is identified by the telephone number associated with the telephone line or calling device used by the calling party. In another implementation, generally referred to as "caller ID deluxe," an intelligent call processing system is used to determine the name of the subscriber who pays for the telephone service in connection with the calling party's telephone line. In this way, the calling party is identified to the receiving party by name and telephone number. A shortfall to this approach, however, is that any number of people who reside at a particular subscriber premise may be the calling party, not necessarily the subscriber who pays for the service.

One known method used to identify a particular calling party, independent from the originating telephone number or who pays for the telephone service, is "real caller ID." Real caller ID implements a voice identification system wherein the calling party is prompted for a voice response, which is then stored in a database and compared to previously collected voice templates. In this way, real caller ID is able to uniquely identify a calling party based upon recognition of a voice template. Disadvantageously, this caller identification method requires active participation from the calling party. Accordingly, there is a need for a system and method of passive caller identification that is capable of detecting the identity of the calling party without active participation from the caller.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF THE PREFERRED EMBODIMENTS

Introduction

A preferred system and method are described herein for implementing an enhanced caller identification function using biometric keystrokes. The system includes network devices and software used to determine the identity of a calling party based on the calling party's dialing characteristics. Specifically, the preferred system measures the amount of time the calling party holds down each key (i.e., "dwell time") and the amount of time between each keystroke (i.e., "flight time"). The dwell and flight times are collected and compared using statistical analysis to a database of previously collected dwell and flight times to determine if a match exists to a prior call.

System Overview

Figure 1:
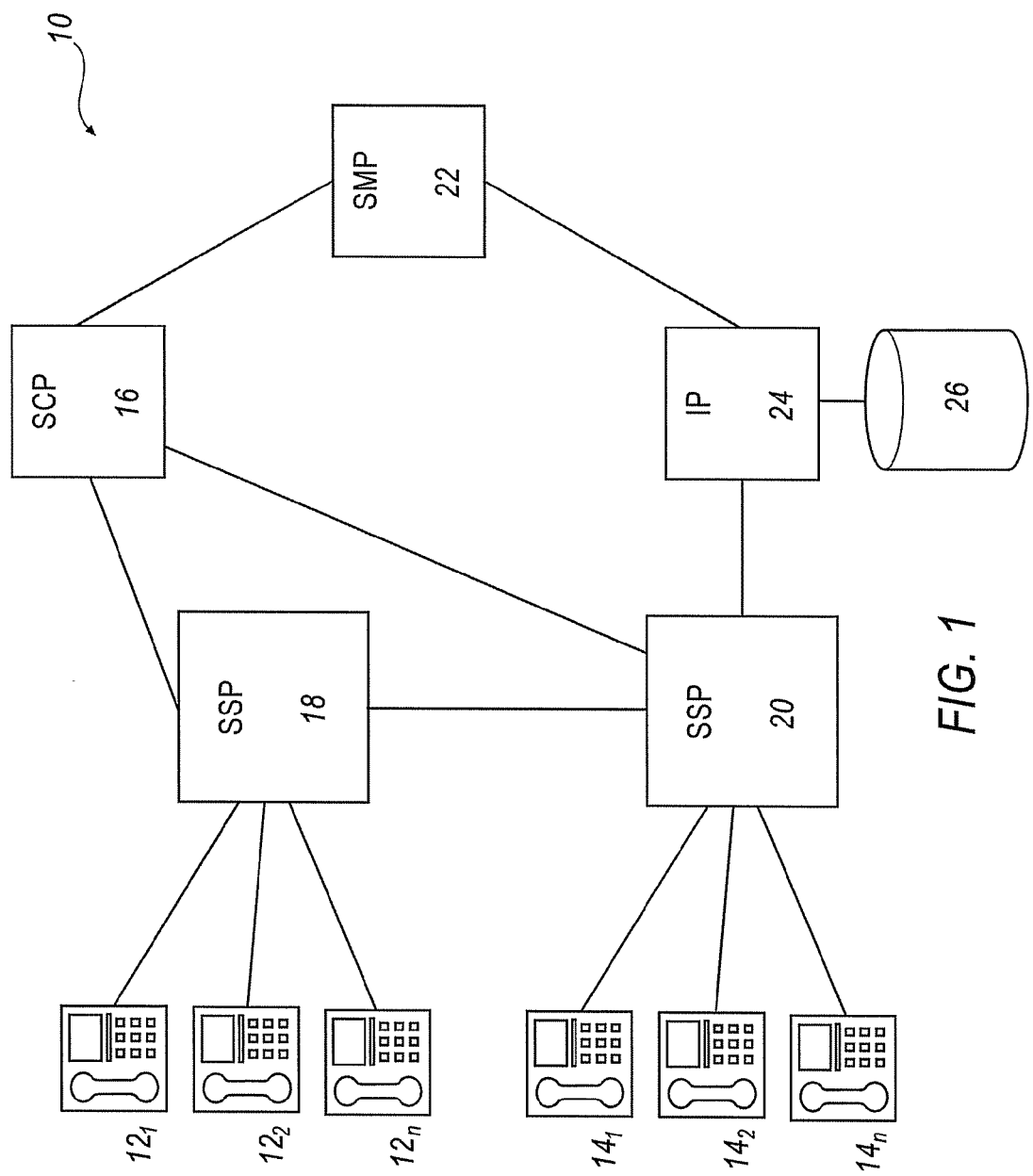
FIG. 1 is a exemplary communications network for routing a call from a calling party to a receiving party, according to an embodiment.

One of ordinary skill in the art understands that the system and methods disclosed herein are exemplary and can be adapted or modified without departing from the scope of the present disclosure. FIG. 1 illustrates an exemplary portion of an advanced intelligent network (AIN) 10 having calling devices $12_{1, 2, \ldots, n}$ and $14_{1, 2, \ldots, n}$, in connection with a plurality of service switching points (SSPs) 18, 20. SSPs 18, 20 are telephone exchange devices that route call information to a service control point (SCP) 16 and serve as call gateways for both incoming and outgoing calls. The SCP 16 includes a digital computer software application referred to as AIN service logic. The AIN service logic can be written in any of a multitude of computer programming languages (e.g., C, 4GLs) and directs the flow (sequential and conditional) of instructions within the SCP 16 for a particular application. In this way, the AIN service logic defines the service application itself. Upon an off-hook condition (e.g., a call initiated from one of calling devices 12, 14), the SSPs 18, 20 are configured to access service information from SCP 16 and route the call based on the type of calling service available for a particular calling party and instructions from SCP 16. Although specific configurations will vary, SCP 16 generally includes a computer system that performs intelligent network call processing during the operation of a call.

Network 10 further includes a service management point (SMP) 22 in connection with both the SCP 16 and an intelligent peripheral (IP) 24. The SMP 22 supports operation of IP 24 and runs service management applications including downloading new service logic, downloading new service provisioning data (e.g., new phone numbers), receiving service log data, and remote management of the SCPs 18, 20. In one embodiment, IP 24 includes a database 26 and a general purpose programmable processor capable of performing dialed digit collection, dial tone modulation frequency (DTMF) signal reception, and text-to speech synthesis.

Exemplary Process

Figure 2:
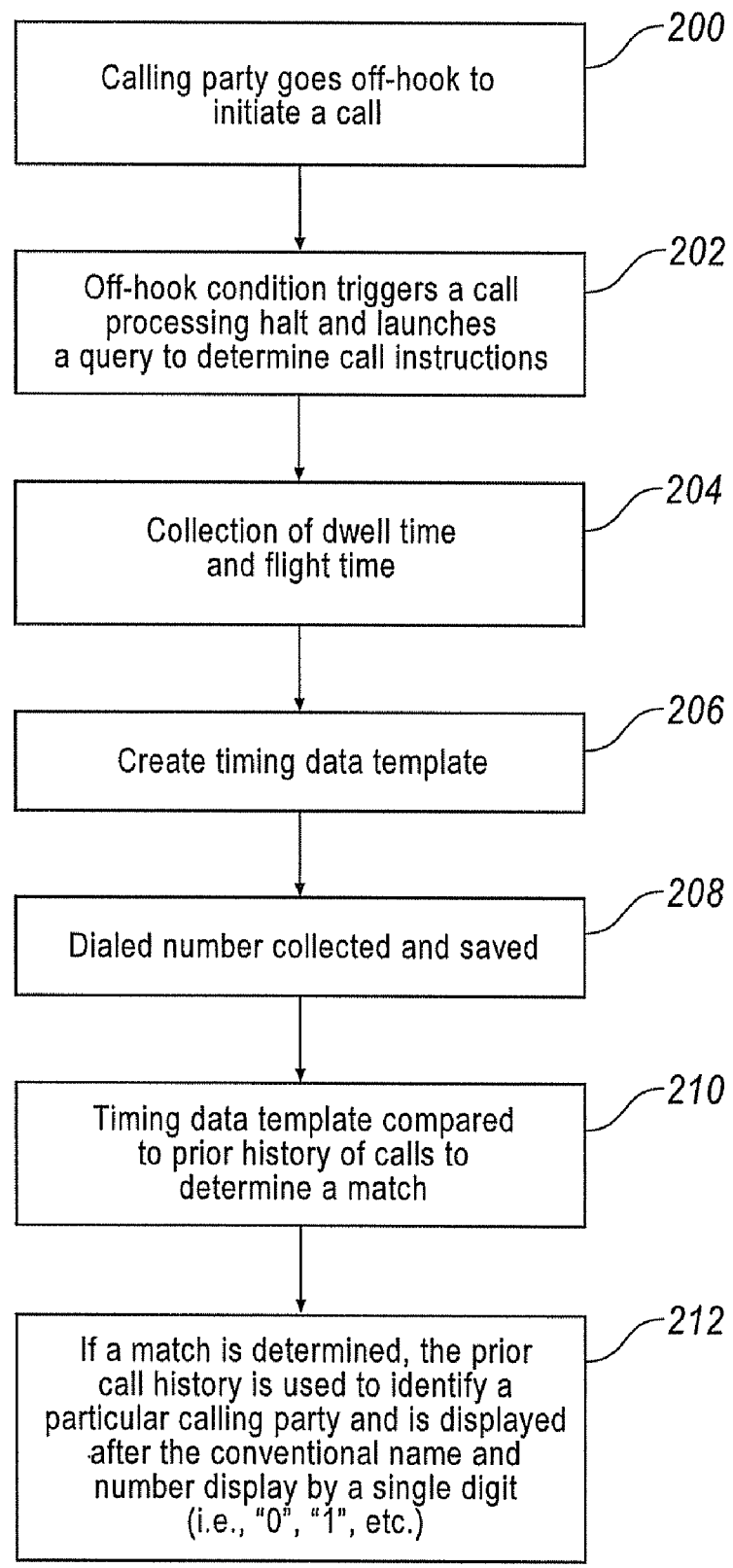
FIG. 2 is a flow chart illustrating an exemplary process for routing a call from a calling party to a receiving party, according to an embodiment.

FIG. 2 illustrates an exemplary process for determining the identity of a calling party based on the calling party's biometric dialing characteristics. References to physical components refer to the exemplary components illustrated in FIG. 1. At step 200, a calling party from calling device $12_1$ goes off-hook to initiate a call. The off-hook condition at step 202 triggers a call processing halt at SSP 18 and a query is launched to SCP 16 to determine the call processing instructions (i.e., AIN service logic). Upon determination of the service parameters for a particular called party (e.g., $14_1$), the AIN service logic from SCP 16 directs at step 204 the collection of dwell time (i.e., the amount of time the caller holds down each key) and flight time (i.e., the amount of time between each keystroke) information. This set of timing data is used to create a template at step 206 that is stored in the database 26. In one embodiment, the collection of dwell and flight time information is controlled solely through SCP 16, however, one of ordinary skill in the art understands that any number of network components can be configured to collect and store the biometric information. For example, in another exemplary embodiment, SCP 16 can be configured to operate in conjunction with IP 24 to perform collection and storing functions.

At step 208, the AIN service logic collects and saves into database 26 the number that the calling party dialed (i.e., the dialed number). The AIN service logic then compares at step 210 the set of timing data (i.e., the dwell and flight times) with the called party's prior history of calls. In other words, the timing data template for the current call is compared to timing data templates for prior calls to the same dialed number to determine if there exists a match. A variety of statistical methods can be used to determine whether there is a match. For example, correlation coefficients (e.g., Pearson r's) can be calculated for the mean prior dwell and flight times and the current (i.e., new incoming call's) dwell and flight times. If sufficiently high correlations are achieved for the dwell and flight times, then a match would be said to have occurred. Many other mathematical methods (e.g., Markov modeling) could likewise be used to determine if the pattern of prior dwell and flight times matches the dwell and flight times of a new caller. The present disclosure imposes no restrictions on the mathematical method by which a match is determined.

If at step 212 the AIN service logic determines that a match exists between the current call and a prior call, then any information associated with the prior call is retrieved from database 26 and used to enhance the present calling party's identification information. In one embodiment a particular caller can be identified by a single digit (i.e., 1-9) that appears on the display screen after the name and/or telephone number of the calling party. Specifically, the calling party can be first identified using conventional caller ID methods, but enhanced by the display of a single digit that represents a particular caller from that subscriber premise. For example, if there are four members of a family who reside at a particular subscriber premise, each could be identified to a receiving party by a "1", "2", "3" or "4". Therefore, the receiving party would see a display with the name and phone number of the subscriber followed by a "1", "2", "3" or "4", which identifies the different members of the family based on their biometric calling characteristics.

In the same way individual family members can be identified by the biometrics of their keystrokes, a calling party can be identified as having used speed dialing for the current call by the mechanical nature of the keystrokes. In other words, a caller using speed dialing can be determined by the non-human (i.e., mechanical) pattern of dwell and flight times associated with speed dialing. The non-human or mechanical pattern is revealed by the regularity, uniformity, or sameness of dwell and flight times for the call. This regularity identifies the call as unlikely to have been dialed by a human being and likely to have been dialed by a machine. A multitude of mathematical methods can be used to determine this regularity. For example, in contrast to a human being call pattern, where flight times are likely to vary due to fingers moving across the keypad, a speed-dialed call may be indicated if all flight times are equal (within some tolerance level). Likewise, one could check for the equality of all dwell times; if all are equal, then the call is likely to be from a speed dialer. Various mathematical methods that calculate statistical variances and standard deviations of dwell and flight times can also be applied to determine if there exists a pattern of dwell and flight times that lack the variability normally associated with human performance. If the statistical variability in the pattern of dwell and flight times is so low as to be uncharacteristic of human performance, then the call is likely from a speed dialer. In one embodiment, this information can be communicated to the called party by delivering to the caller ID) display an indication of a speed dialer by, for example, reserving the digit "0" for a speed dialed call (versus the digits "1" through "9" for distinct members of a family using the same telephone line). In other words, when a called party sees a "0" digit on the caller ID display, the called party will know it to be likely from a speed dialer. That an incoming call is from a speed dialer may be helpful information to the called party, because it may suggest either a close friend (especially if conventional caller ID indicates a known household) or a call to avoid (e.g., a telemarketer displaying an unknown conventional caller ID).

In another embodiment, biometric characteristics of the calling party can be used to replace anonymous caller ID information with probabilistic enhancements. For example, if the identity of the caller cannot be determined using the methods described above, the unique pattern (i.e., signature) of dwell and flight times can be captured and compared against all other prior, stored caller signature patterns to that called party. In this way, the captured signature patterns of dwell and flight times can be used to calculate correlations between the current caller and all previously stored patterns to determine whether the current caller pattern closely matches any prior calling patterns. If a close match is found, then the name and number associated with that caller could be displayed (the name and number would be retained from past instances when the caller's location was determined by conventional caller ID, such as when the caller dialed from a home location). This past stored information is then used to display the caller's name and number to the called party on the caller ID display (e.g., "Bill Smith? 914-623-8956"). The question mark would indicate the probabilistic nature of the information, i.e., that it is a "best guess." In this way, the called party could receive probabilistic information about who the incoming caller is based on the keying pattern of the caller-even when conventional caller ID fails to provide any useful information.

It should be understood by those skilled in the art that various alternatives to the embodiments of the invention described herein may be employed without departing from the spirit and scope of the invention as defined in the following claims. It is intended that the following claims define the scope of the invention and that any method and system within the scope of these claims and their equivalents be covered thereby. This description of the preferred embodiments should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed as new and desired to be protected by Letters Patent of the United States is:

1. A system, comprising:
   at least one service switching device in communication with a first calling device and a second calling device; and
   at least one service control point in communication with said at least one service switching device and configured to route incoming and outgoing calls between said first and said second calling devices;
   wherein said service control point is configured to:
      collect biometric keystroke data from a plurality of keystrokes executed by a calling party to a called party,
      compare said biometric keystroke data with a biometric template, said biometric template including prior keystroke data acquired from each of a plurality of keystrokes executed by any calling party to said called party, and
      identify said calling party to said called party, in response to said biometric keystroke data matching at least one of said prior keystroke data in said biometric template.

2. The system of claim 1, wherein said biometric keystroke data includes a dwell time for each keystroke and a flight time between keystrokes.

3. The system of claim 1, further including an intelligent peripheral in communication with and configured to control the operation of said service control point.

4. The system of claim 1, further including an intelligent peripheral in communication with said service control point, wherein said intelligent peripheral and said service control point operate in conjunction to collect and store said biometric keystroke data.

5. The system of claim 1, wherein said service control point includes a software application for directing a flow of instructions within said service control point.

6. The system of claim 1, further including a database for storing biometric keystroke data.

7. The system of claim 1, wherein said service control point creates a timing data template containing biometric keystroke data.

8. A method, comprising:
   collecting biometric keystroke data from a first party based on keystrokes executed by said first party to a second party, said keystroke data including recording keystroke timing based on the execution of at least a subset of said plurality of keystrokes;
   comparing, using at least one computing device, said biometric keystroke data from said first party with existing biometric keystroke data to determine if there is a match, said existing biometric keystroke data being acquired from each of a plurality of keystrokes executed by any calling party to said called party; and
   conveying, via said at least one computing device, to said second party the identity of said first party in response to said biometric keystroke data matching at least one of said existing keystroke data.

9. The method of claim 8, further comprising creating a timing data template based on said biometric keystroke data.

10. The method of claim 8, wherein said biometric keystroke data includes a keystroke dwell time and a flight time between keystrokes.

11. The method of claim 8, further comprising determining service parameters for said second party upon initiating a call to said second party.

12. The method of claim 8, further comprising launching a query to determine call processing instructions.

13. The method of claim 8, further comprising saving said biometric keystroke data to a database.

14. The method of claim 8, further comprising displaying the identity of said first party to said second party on a caller identification display.

15. The method of claim 14, wherein the identity of said first party is represented to said second party using a numeral digit that is displayed on said caller identification display.

16. The method of claim 10, wherein comparing said biometric keystroke data includes calculating mean dwell and flight times.

17. The method of claim 8, further comprising controlling the collection of said biometric keystroke data through a service control point.

18. The method of claim 8, further comprising measuring an amount of time said first party holds down each key of a first calling device and an amount of time between each keystroke.

19. A method, comprising:
   capturing, using at least one computing device, signature patterns of keystroke dwell times and keystroke flight times from a first calling party to a second called party;
   calculating, using the at least one computing device, correlations between said signature patterns of said first party with existing signature patterns, said existing signature patterns being acquired from each of a plurality of keystrokes executed by any party to said second called party;
   determining whether said signature patterns from said first party closely match at least one of said existing signature patterns; and
   conveying to said second party a probabilistic identity of said first party based on said correlations.

20. The method of claim 19, wherein the probabilistic identity of said first party is represented to said second party using a numeral digit that is displayed on a caller identification display.

21. The method of claim 15, wherein said numeral digit includes a telephone number of said keystrokes executed by said first party.

22. The method of claim 21, wherein said telephone number is associated with a plurality of first parties, each being associated with at least one keystroke timing recorded in said existing biometric keystroke data.

* * * * *